(12) United States Patent
Zhang et al.

(10) Patent No.: US 11,175,216 B2
(45) Date of Patent: Nov. 16, 2021

(54) MEASUREMENT SENSOR AND MEASUREMENT METHOD FOR MEASURING BOND-SLIP AT STEEL-CONCRETE INTERFACE

(71) Applicant: Dalian University of Technology, Liaoning (CN)

(72) Inventors: Xiufang Zhang, Liaoning (CN); Ruiqiang Liu, Liaoning (CN)

(73) Assignee: Dalian University of Technology

( * ) Notice: Subject to any disclaimer, the term of this patent is extended or adjusted under 35 U.S.C. 154(b) by 64 days.

(21) Appl. No.: 16/749,210

(22) Filed: Jan. 22, 2020

(65) Prior Publication Data
US 2020/0400550 A1    Dec. 24, 2020

(30) Foreign Application Priority Data
Jun. 20, 2019   (CN) .......................... 201910537439.0

(51) Int. Cl.
*G01N 19/00*   (2006.01)
*G01M 5/00*    (2006.01)
*G01N 19/04*   (2006.01)

(52) U.S. Cl.
CPC ................... *G01N 19/00* (2013.01)

(58) Field of Classification Search
CPC ............ G01N 19/00; G01N 19/04; G01N 2203/0623; G01M 5/0025; G01M 5/0041; G01M 5/0083

USPC ............... 73/9, 774–775, 893, 827, 159 A
See application file for complete search history.

(56) References Cited

U.S. PATENT DOCUMENTS 10,126,186 B2 *  11/2018  Berme ................. G01L 5/107
2009/0301217 A1 * 12/2009  Kurtz .................. G01L 3/1457
                                                73/847

* cited by examiner

*Primary Examiner* — Peter J Macchiarolo
*Assistant Examiner* — Anthony W Megna Fuentes
(74) *Attorney, Agent, or Firm* — Lerner, David, Littenberg, Krumholz & Mentlik, LLP (57) ABSTRACT

Disclosed are a measurement sensor and a measurement method for measuring bond-slip at a steel-concrete interface (SCI). The measurement sensor mainly includes a specially-made spring steel sheet, strain gauges, force transmission clamps, flat-head rounded-corner limiting rods, a Π-shaped metal jacket, rectangular metal jackets, inverted T-shaped metal jackets, and wires. Two electric resistance strain gauges are respectively bonded on the front and back sides of the specially-made spring steel sheet; each electric resistance strain gauge is welded with a thin wire; two force transmission clamps are respectively fastened on the front and back sides of the specially-made spring steel sheet though rivets; a core measurement element is inserted into a measurement box assembled by three metal jackets above; the inverted T-shaped metal jackets are fastened through screws. Finally, the assembled structure is installed on a to-be-measured SCI using flat-head rounded-corner limiting rods, so as to form the measurement sensor.

8 Claims, 7 Drawing Sheets

MEASUREMENT SENSOR AND MEASUREMENT METHOD FOR MEASURING BOND-SLIP AT STEEL-CONCRETE INTERFACE

CROSS REFERENCE TO RELATED APPLICATIONS

This application claims priority from Chinese application number 201910537439.0, filed Jun. 20, 2019, the disclosure of which is hereby incorporated herein by reference.

TECHNICAL FIELD

The present invention belongs to the civil engineering field, relates to a test measurement device, and in particular, to an interface bond-slip measurement sensor and measurement method for a steel-concrete composite structure, which are used for measuring relative slip at a steel-concrete interface (SCI), in order to establish a bond-slip mechanical model for the SCI, and to further study the effect of interface bond-slip on the mechanical performance of a steel-concrete composite structure.

BACKGROUND

For a steel-concrete composite structure, bonding between the steel and concrete is a prerequisite for enabling the steel to work with concrete together and for realizing stress transfer between them, which is similar to that between a reinforcing steel bar and concrete for a reinforced concrete structure. Such bonding action enables the steel and concrete to work and undertake load together, eventually forming a real composite structure. The bond-slip relationship for describing such bonding action between the steel and the concrete has straight-forward effects on the performance of a steel-concrete composite component, i.e., deformation, cracks, bearing capacity, and failure modes. Therefore, many concerns on bond-slip relationship for a SCI have been given in the engineering field. Most of the domestic and abroad related researches on the bond-slip relationship between steel and concrete usually adopt indirect methods, for example, the push-out test, the pull-out test, the short-column test, as well as an integral calculation method based on a strain difference between the steel and the concrete. These methods are unable to well reflect the internal bond-slip behavior, and therefore there are many empirical formulas to be developed in practical calculation. Moreover, these methods still do not in essence represent the key characteristics of the bond-slip behavior at the SCI of the composite structure. Therefore, studying the bond-slip behavior at the steel-concrete interface to obtain relative slip and a bond stress distribution law as well as to establish an appropriate bond-slip constitutive model is of very great significance for the mechanical performance calculation of structural components, design of shear connectors, and numerical simulation analysis of the bond-slip effect on the mechanical performance of structures.

SUMMARY

Figure 1:
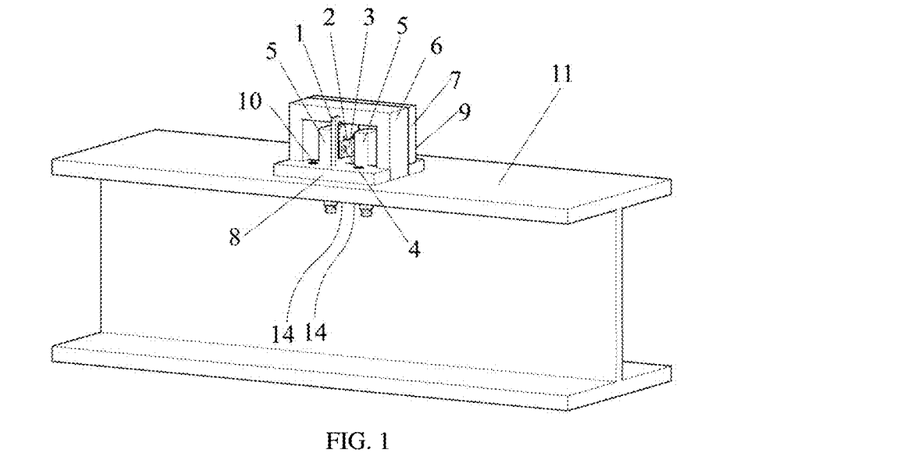
FIG. 1 is an overall schematic diagram of an internal and external structure along with measurement points of the present invention.

In view of the problems existing in the prior art, the present invention presents a device and method for measuring bond-slip at a steel-concrete interface (SCI), which provides a basis for establishing a bond-slip constitutive relationship of the SCI. FIG. 1 is an overall schematic diagram of internal and external structures along with measurement points of the present invention.

To achieve the foregoing objective, the present invention is implemented by using the following technical solutions:

After a measurement sensor for measuring bond-slip at a SCI is calibrated, both bond-slip and bond stress at the steel-concrete interface can be conveniently and accurately measured by this measurement sensor, and the impact of the bond-slip at the interface on the mechanical performance of a structural component may be further analyzed.

The measurement sensor includes a core measurement element, a measurement box, and two flat-head rounded-corner limiting rods 5, where the core measurement element is inserted into the measurement box and is located between the two flat-head rounded-corner limiting rods 5.

The core measurement element includes a specially-made spring steel sheet 1, two identical electric resistance strain gauges 2, two identical force transmission clamps 3, and rivets 4. Two electric resistance strain gauges 2 are respectively bonded on the front and back surfaces in the middle of the specially-made spring steel sheet 1. Each of electric resistance strain gauges 2 is welded with a thin wire 14 that is extended out from the lower part of the measurement box (extending out from a rectangular opening formed by two inverted T-shaped metal jackets 8 on the bottom of the measurement box) and is subsequently led out from a wire leading hole 13 on a to-be-measured contact surface 11. Two wires 14 are finally connected to a data acquisition instrument. Two force transmission clamps 3 are respectively fastened through the rivets 4 on the front and back sides of the specially-made spring steel sheet, or in other words, the specially-made spring steel sheet is located between the two force transmission clamps 3 and the rivets 4 are located on two sides of the spring steel sheet 1 and the force transmission clamps 3. Two rivet holes, which are used for rivet anchoring, are arranged on each side of the spring steel sheet 1 and the force transmission clamps 3. An outer edge with a specific width is arranged around the specially-made spring steel sheet 1, and a specific space is reserved around an inner side to allow for the embedment of the specially-made spring steel sheet 1 into a rectangular groove of the measurement box. In this way, there may be a reversed deformation space to be provided in the specially-made spring steel sheet.

The measurement box includes a Π-shaped metal jacket 6, two same rectangular metal jackets 7, two same inverted T-shaped metal jackets 8, and screws 9 with spring rings 15. The Π-shaped metal jacket 6 is placed between the two rectangular metal jackets 7, and the inverted T-shaped metal jackets 8 are arranged below the measurement box. A rectangular groove, which is used for insertion of the upper part of the core element, is provided on the upper inner wall of the Π-shaped metal jacket 6. The bolt holes are provided along a thickness direction of the Π shape. Two sides of the metal jacket 6 are respectively rigidly connected to the rectangular metal jackets 7 through the screws 9, and are then fastened through nuts. A rectangular groove, which is used for insertion of the core element, is also provided on an inner wall (in a direction towards an interior of the box) of the two rectangular metal jackets 7. The bottom of the rectangular metal jackets 7 is rigidly connected to the upper surface of the inverted T-shaped metal jackets 8 through bolts 10. A rectangular groove, which is used for insertion of the bottom of the core element, is provided on an inner wall (in the direction towards an interior of the box) of each inverted T-shaped metal jacket 8. The inverted T-shaped metal jackets 8 are set as the bottom of the measurement box. The bottom of the inverted T-shaped metal jackets 8 and the to-be-measured contact surface 11 are sealed through sealant.

A wire leading hole 13 is provided on the to-be-measured contact surface 11. Threaded holes 12 used for fastening the flat-head rounded-corner limiting rods 5 are provided on two sides of the wire leading hole 13. The two threaded holes 12 and the wire leading hole 13 are arranged along a direction of the to-be-measured bond-slip. The wire leading hole 13 is used for leading out wires 14. The threaded holes 12 are arranged at measuring point positions required for sectional steel or a steel bar. A distance between the two threaded holes 12 is D (D is also a distance between two protruding points on the two sides of the core element).

Further, the force transmission clamps 3 should have sufficient rigidity so that no deformation and reliable force transmission occur during the loading process. Each of force transmission clamps 3 is of a π-shaped structure. A pyramidal or conical-protruding structure is designed in the middle of the protruding structure. A distance between two protruding points in the middle of the force transmission clamps 3 is D. The force transmission clamps 3 are in contact with the upper contact surface of the flat-head rounded-corner limiting rods 5. One end of the flat-head rounded-corner limiting rods 5 with a thread is a rounded rectangle, and its other end is a threaded cylinder.

Further, the specially-made spring steel sheet 1 is fabricated using a material with good linear elasticity, or may be fabricated using other materials with comparable linear elasticity, including beryllium bronze, 65 Mn steel material, or the like.

A measurement method based on the foregoing measurement sensor for measuring bond-slip at a SCI is provided, including the following steps:

Step 1: Drill three holes on the to-be-measured contact surface 11, where two of the holes are used for fastening the flat-head rounded-corner limiting rods 5, and another one is used for leading out a measurement wire. The two flat-head rounded-corner limiting rods 5 are closely connected to steel and concrete through the threaded holes 12 on the to-be-measured contact surface 11, making them carry load together without relative displacement. No deformation occurs during the loading process of the two flat-head rounded-corner limiting rods, reflecting a real situation at measuring point positions at a steel-concrete interface.

Step 2: Assemble the core measurement element and the measurement box. The core measurement element is inserted between the two flat-head rounded-corner limiting rods 5, and the protruding points in the middle of the force transmission clamps 3 on two sides of the core measurement element should be exactly in close contact with the flat-head rounded-corner limiting rods 5.

Step 3: When relative slip occurs at the SCI of a steel-concrete structure, concrete deformation will push the whole measurement box to slightly slip along a direction of measured bond-slip. At this moment, the whole measurement box is loaded and transmits force to the core measurement element whose four sides are embedded into four slots on the inner wall of the measurement box. According to the foregoing assumption that the two flat-head rounded-corner limiting rods 5 on a contact surface of the measured steel are kept fixed, the protruding points on two sides of the force transmission clamps are confined, resulting in the deformation of the core measurement element. The deformation of the core measurement element simultaneously will cause the deformation of the middle specially-made spring steel sheet, whose value is measured by the electric resistance strain gauges bonded on the specially-made spring steel sheet and is acquired through a data acquisition system.

Step 4: Finally, for this assembled bond-slip measurement sensor, a relationship curve between stress and strain, that is, an $\sigma$-$\varepsilon$ curve, may be obtained through a load calibration approach, or a relationship curve between displacement and strain, that is, an s-$\varepsilon$ curve, may be obtained through the displacement calibration approach. Then, one may use the obtained sensor's $\sigma$-$\varepsilon$ curve to model the bond-slip behavior at a measured steel-concrete interface, and to further establish a bond-slip mechanical model at the steel-concrete interface for this type of composite structure.

Advantages and beneficial effects of the present invention are as follows:

The design of the presently-invented SCI bond-slip measurement sensor adequately considers the adverse factors that may exist during the process of installing and subsequent measurement. For the present invention, the adverse impact of the traditional embedded sensor, which may be caused due to the entrance of the hazardous substances such as water or cement slurry into the measurement box during pouring and vibrating concrete, may be eliminated. For example, all contact surfaces during assembling the foregoing components and the wire holes are sealed through sealant; the bottom of the inverted T-shaped metal jackets 8 and the surrounding of the measured contact surface 11 are coated with an appropriate amount of epoxy resin or the like for temporary fastening to avoid its detachment from the contact surface during sensor installation and concrete pouring process. In addition, it is required that too much amount of epoxy resin should not be used to avoid the effect on the measurement results because of the relatively large adhesion stress at the interface. In the present invention, the torsion of the measurement box, which possibly occurs due to stress complexity and multi-direction of a tested specimen, is considered and is avoided by adopting inverted T-shaped metal jackets as the bottom of measurement box and, at the same time, by arranging a shorter side of the inverted T-shaped metal jackets along a direction of the measured bond-slip. In the present invention, the force transmission clamps 3 are designed to have an appearance of a pyramidal or conical-protruding π-shaped structure to ensure that the force transmission clamps 3 have an accurate force-transmitting point and can provide the reliable force transmission to avoid an occurrence of the poor contact condition such as "dead lock" of force transmission under complex external load.

The bond-slip measurement sensor for a SCI provided in the present invention can directly measure bond stress, slip, and strain at any interface position between steel and concrete, and provide an effective solution to a difficulty of directly measuring bond-slip relationship at a SCI. The present invention has some advantages of high sensitivity, good linearity, a clear principle, an appropriate and adjustable measurement range, simple processing and fabrication, and convenient installation, easy operation, and accurate measurement. Moreover, the present invention is applicable under both monotonic loading (uniaxial push or uniaxial pull test) and low-cycle reversed loading to obtain the bond-slip behavior of steel-concrete interface that is further needed in the theoretical or numerical performance analysis of a composite structure. Tested measurement shows that it is in effectiveness and in reliability for the presently invented SCI bond-slip measurement device.

In the figures, 1. spring steel sheet; 2. strain gauge; 3. force transmission clamp; 4. rivet; 5. flat-head rounded-corner limiting rod (with a spring ring); 6. Π-shaped metal jacket; 7. rectangular metal jacket; 8. inverted T-shaped metal jacket; 9. small screw; 10. screw; 11. to-be-measured contact surface; 12. threaded hole; 13. wire leading hole; and 14. wire; 15. spring ring.

DETAILED DESCRIPTION

The present invention is further described below with reference to specific demonstration.

A sensor for measuring bond-slip at a steel-concrete interface (SCI) is provided, and its specific structure is as follows:

The measurement sensor includes a core measurement element, a measurement box, and two flat-head rounded-corner limiting rods 5. The flat-head rounded-corner limiting rods 5 are provided with a thread and a spring ring. The core measurement element is inserted into the measurement box to form the measurement sensor.

Figure 2A:
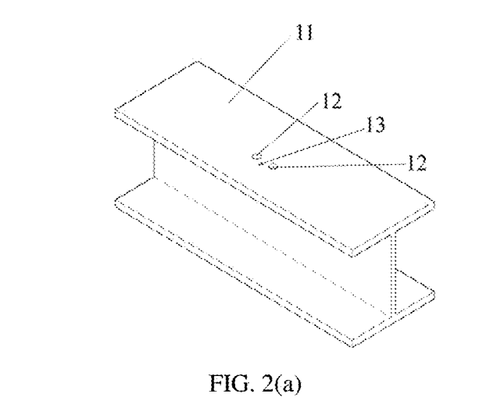
FIG. 2(a) shows a schematic structural diagram of the first perspective of view for layout of measurement points of steel and threaded flat-head rounded-corner limiting rods.
Figure 2B:
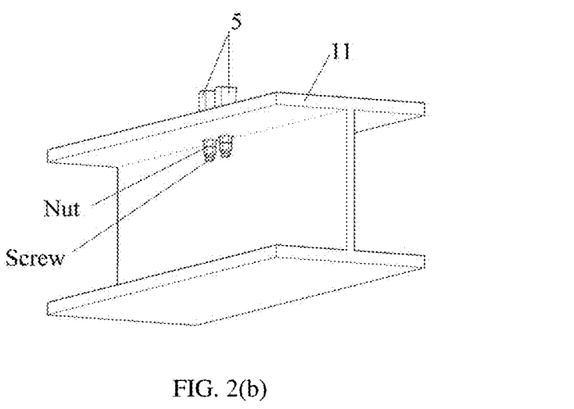
FIG. 2(b) shows a schematic structural diagram of the second perspective of view for layout of measurement points of steel and threaded flat-head rounded-corner limiting rods.

A layout of measurement points is as follows:

Measurement points of sectional-steel or a steel bar and positions of the flat-head rounded-corner limiting rods are shown in FIG. 2. Three holes are drilled at to-be-measured positions on the sectional-steel or steel bar by a professional drilling machine. Two of the holes are used for fastening threaded holes 12 of the flat-head rounded-corner limiting rods 5, and another one is a wire leading hole 13. Two wires 14 respectively connecting two strain gauges are led out from the hole 13 on the outside of a tested specimen. The three holes are arranged along a direction of to-be-measured bond-slip. A distance D between the two bolt holes 12 is the distance between two protruding points on the two sides of the core measurement element, and is also the distance between the threaded holes for the two threaded flat-head rounded-corner limiting rods.

Figure 3A:
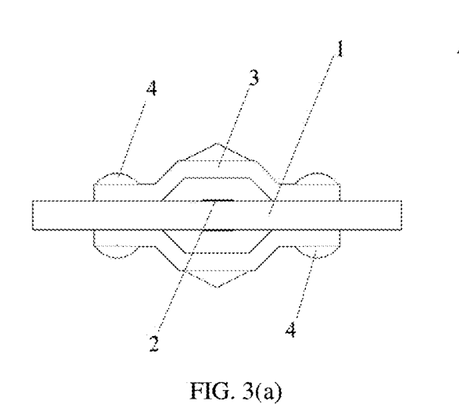
FIG. 3(a) is a top view of a core measurement element.
Figure 3B:
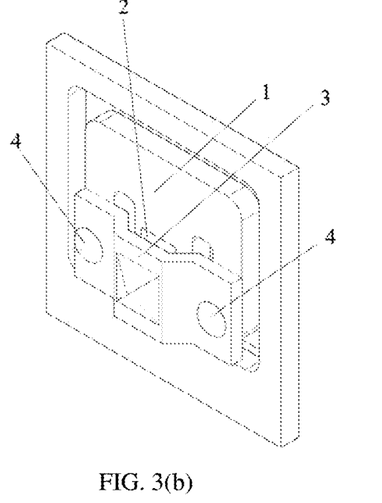
FIG. 3(b) is a schematic structural diagram of a core measurement element.
Figure 4A:
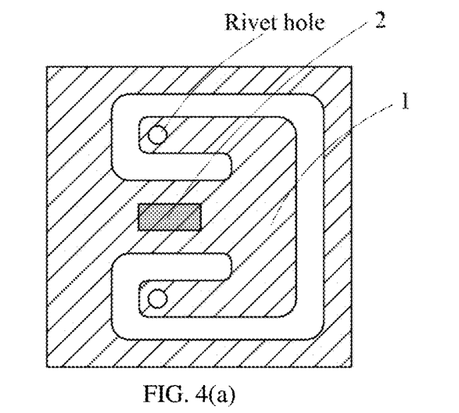
FIG. 4(a) is a front view of a specially-made spring steel sheet.
Figure 4B:
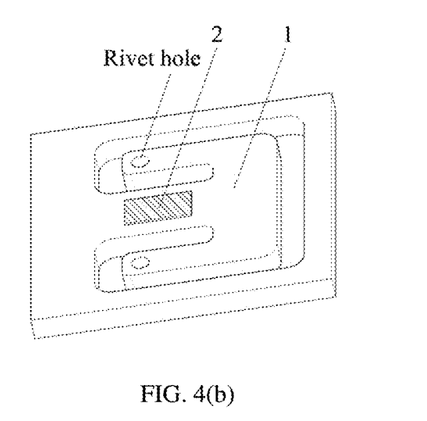
FIG. 4(b) is a schematic structural diagram of a specially-made spring steel sheet.
Figure 5A:
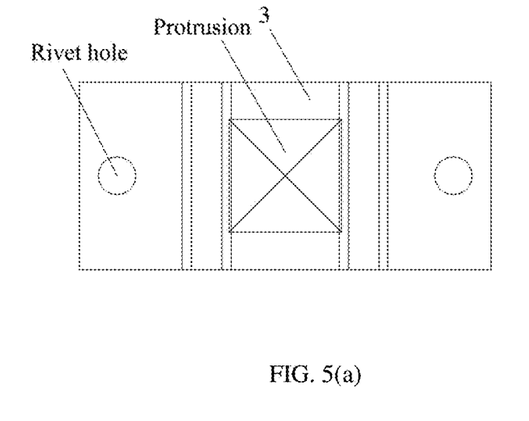
FIG. 5(a) is a front view of a force transmission clamp.
Figure 5B:
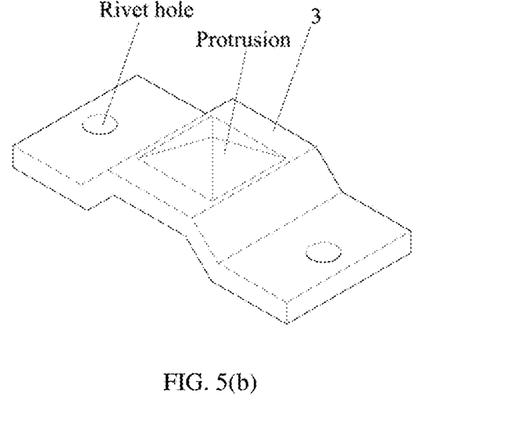
FIG. 5(b) is a schematic structural diagram of a force transmission clamp.

Assembly of the core measurement element is as follows:

In the measurement sensor, a structure of the core measurement element is shown in FIG. 3, which includes a specially-made spring steel sheet 1, electric resistance strain gauges 2, force transmission clamps 3, and rivets 4. The specially-made spring steel sheet 1 is cut into a shape shown in FIG. 4 by a computer numerically-controlled machine tool in a factory, and rivet holes are provided on the specially-made spring steel sheet 1. The force transmission clamps 3 are cut into a configuration shown in FIG. 5, with an appearance of a pyramidal or conical-protruding 7E shape. The electric resistance strain gauges 2 are respectively bonded on both front and back surfaces in the middle of the specially-made spring steel sheet 1. A step for bonding the two electric resistance strain gauges 2 is strictly conducted in accordance with the test requirements. A pair of thin wires 14 is welded on electric resistance strain gauges 2, and their lengths are determined in accordance with the specific test requirements. A pair of wires 14 is extended out from the bottom of the measurement box, that is, the wires 14 are led out from a rectangular opening formed by two inverted T-shaped metal jackets 8 on the bottom of the measurement box. Rivets are used for fixing the foregoing force transmission clamps to the specially-made spring steel sheet, and thus the core measurement element is formed.

Figure 6A:
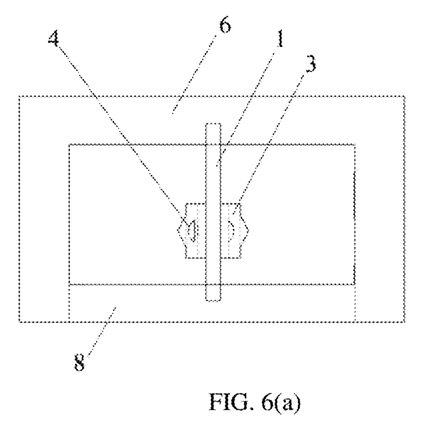
FIG. 6(a) is a front view of a local structure of a measurement box.
Figure 6B:
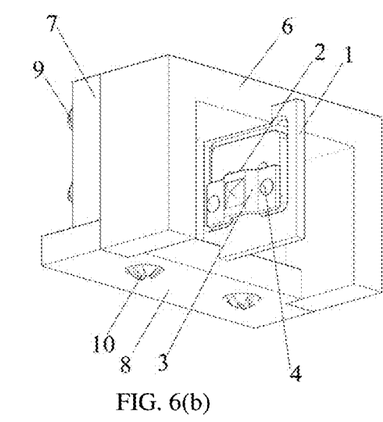
FIG. 6(b) is a schematic structural diagram of a local structure of a measurement box.

Assembly of the measurement element is as follows:

In the measurement sensor, a local structure of the measurement box is shown in FIG. 6. The measurement box includes a Π-shaped metal jacket 6, two identical rectangular metal jackets 7, two identical inverted T-shaped metal jackets 8, and screws 9 with spring rings 15. In this measurement box, the mentioned Π-shaped metal jacket 6 is arranged between the two rectangular metal jackets 7 and the inverted T-shaped metal jackets 8 are arranged below the Π-shaped metal jacket 6. The bottom of the inverted T-shaped metal jackets 8 is sealed through sealant with a to-be-measured contact surface 11 on which a wire leading hole 13 is provided for leading out of the wires 14. A rectangular groove is provided on an inner wall of the top of the Π-shaped metal jacket 6, and is used for insertion of the core element. Six bolt holes are provided on each side along a thickness direction of the Π shape, and are used for installation of the rectangular metal jackets 7 at corresponding positions. A rectangular groove is provided on an inner wall of a pair of rectangular metal jackets 7, and is used for insertion of the core element. In addition, a total of six bolt holes are provided at two upper corners on each side; and two bolt holes are provided along a thickness direction of the bottom of the Π-shaped metal jacket and are consistent with positions of two bolt holes in circular grooves of the inverted T-shaped metal jackets on the bottom surface. Finally, the rectangular metal jackets are connected to the Π-shaped metal jacket by using the small screws 9 with spring rings 15, in order for the assembly of the measurement box.

Figure 7A:
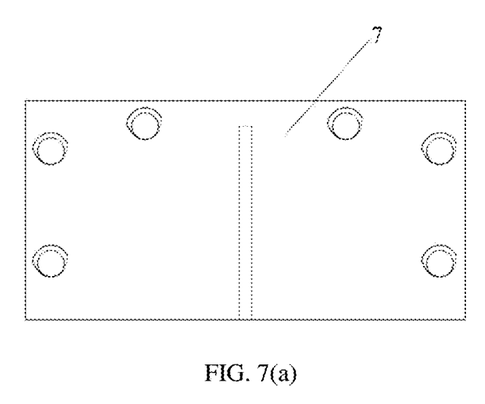
FIG. 7(a) is a front view of a rectangular metal jacket.
Figure 7B:
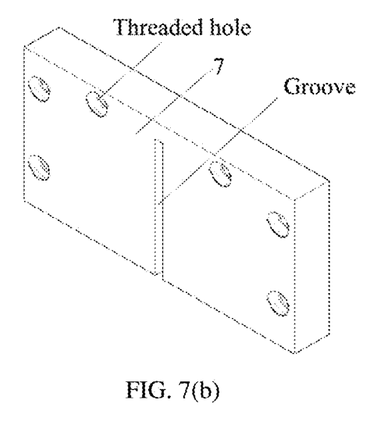
FIG. 7(b) is a schematic structural diagram of a rectangular metal jacket.
Figure 8A:
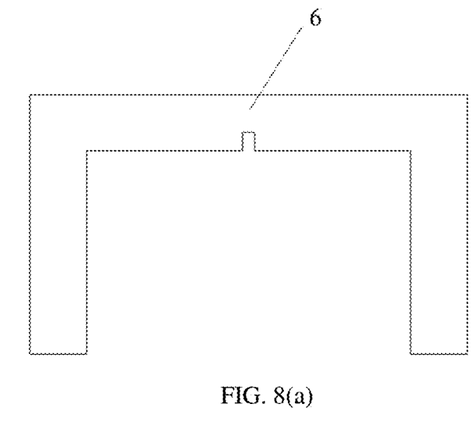
FIG. 8(a) is a front view of a Π-shaped metal jacket.
Figure 8B:
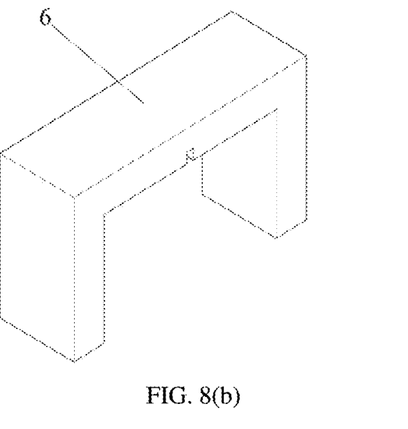
FIG. 8(b) is a schematic structural diagram of a Π-shaped metal jacket.
Figure 9:
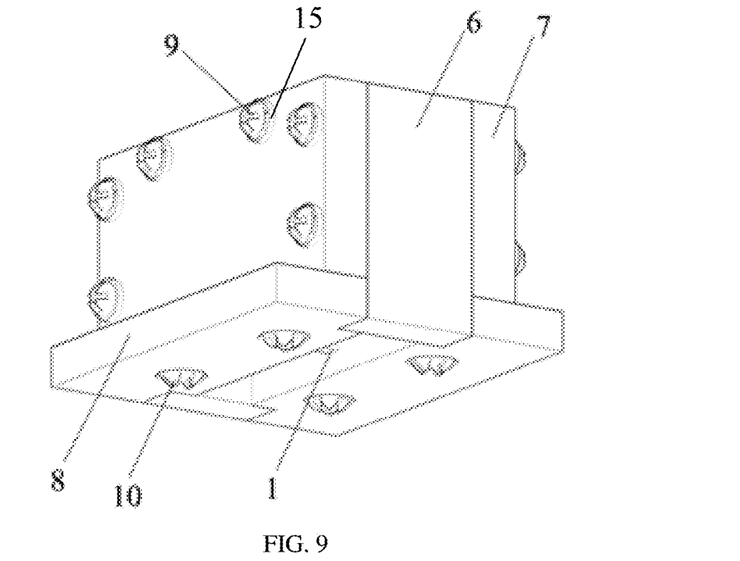
FIG. 9 is a schematic structural diagram of a measurement box.
Figure 10A:
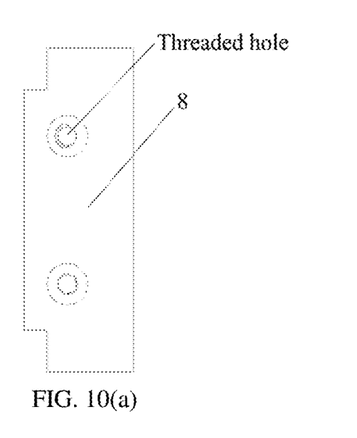
FIG. 10(a) is a front view of an inverted T-shaped metal jacket.
Figure 10B:
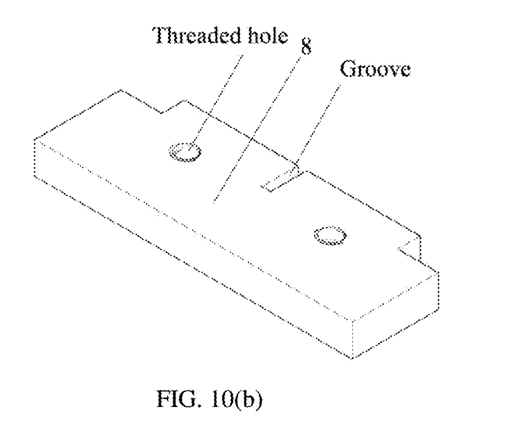
FIG. 10(b) is a schematic structural diagram of an inverted T-shaped metal jacket.
Figure 12:
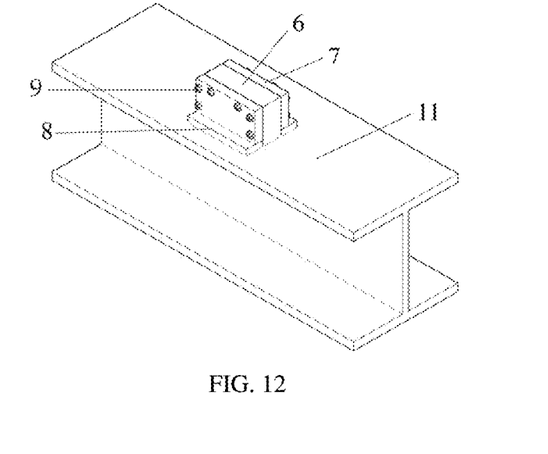
FIG. 12 is a steel-concrete interface bond-slip measurement sensor.

Fabrication and assembly of the measurement sensor are as follows:

First, one of two rectangular metal jackets 7 is fastened to a side (a thickness direction) of the Π-shaped metal jacket 6 by six small screws with spring rings, and the sealant is uniformly coated on a fastened contact surface. The same method and step is also adopted for another rectangular metal jacket 7. In this case, a groove on an inner wall also forms a Π-shaped slot. A structure of the rectangular metal jacket is shown in FIG. 7. A structure of the Π-shaped metal jacket is shown in FIG. 8. The assembled core measurement element is then inserted into the Π-shaped slot on the inner wall of the measurement box, as shown in FIG. 6. The inverted T-shaped metal jackets 8, as shown in FIG. 1, FIG. 9 and FIG. 10, are assembled with the local structure of the measurement box. In other words, they are fastened into the reserved screw holes with screws to complete the installation of one side of the measurement box, and the sealant is then uniformly coated on the fastened contact surface. The same step and method is applied for the installation of another side of the measurement box. Finally, fabrication and assembly of the overall measurement box are completed, and a steel-concrete interface bond-slip measurement sensor is formed, as shown in FIG. 12.

Figure 11:
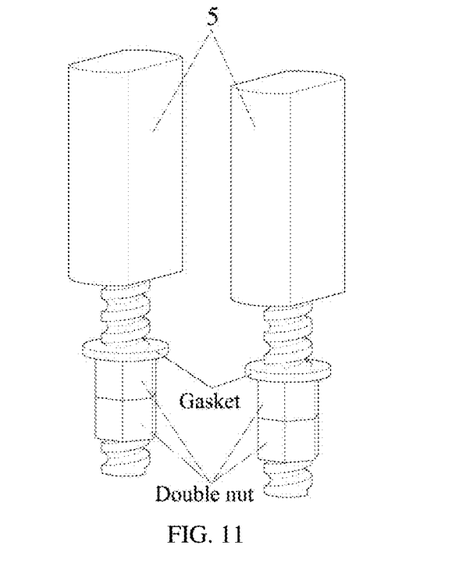
FIG. 11 is a schematic structural diagram of flat-head rounded-corner limiting rods.

Second, after fabrication and assembly of the measurement box, the threaded flat-head rounded-corner limiting rods 5 are installed at the measuring positions on the sectional-steel or a steel bar. As shown in FIG. 11, gaskets are first placed into the flat-head rounded-corner limiting rods 5, and two nuts are screwed. Alternatively, spot welding may be conducted to enhance fastness.

Next, the wires 14, which are led out from the core element, are extended out from the holes 13 on the sectional steel or steel bar, short edges of the inverted T-shaped metal jackets 8 are arranged along the direction of the to-be-measured bond-slip, and then the core element is accurately inserted between the two threaded flat-head rounded-corner limiting rods 5. In this way, both inner sides of the two threaded flat-head rounded-corner limiting rods 5 should be exactly in close contact with the core element.

Finally, the bottom of the measurement box (the bottom of the inverted T-shaped metal jackets) is uniformly coated with sealant, and then a small amount of epoxy resin is uniformly coated around the bottom for temporary fastening to prevent the separation of the bottom of the inverted T-shaped metal jackets 8 from the sectional steel or steel bar during sensor installation and concrete casting. In this way, fabrication and installation of the measurement sensor are completed.

Before the test, a relationship between force and strain may be calibrated for a bond-slip measurement sensor by a load sensor fixed on a testing machine. Then, the stress of the bond-slip measurement sensor at the measuring points can be obtained based on a loading area of the load sensor, and thus an $\sigma$-$\varepsilon$ curve of the bond-slip measurement sensor may be obtained. Alternatively, a relationship between displacement and strain may be calibrated through the displacement control loading pattern, to obtain a relationship curve between displacement and strain, namely, an s-$\varepsilon$ curve. The above steps are repeatedly done to calibrate the bond-slip sensor. Then, the sensor may be used to measure bond-slip inside a test specimen. Before pouring the test specimen, the calibrated sensor is first embedded. According to the measured data, a mechanical model for describing the bond-slip behavior at a SCI may be established and applied to the structural analysis of a steel-concrete composite structure to further study the impact of bond-slip on its overall mechanical performance.

The foregoing demonstrations only clarify implementations of the present invention and shall not be considered as a limitation on the scope of the invention patent. It should be pointed out that various variations and improvements can be made by the technician in this field without deviating from the conception of the present invention and all these should be within the protection scope of the present invention.

What is claimed is:

1. A measurement sensor for measuring bond-slip at a steel-concrete interface (SCI), wherein the measurement sensor can conveniently and accurately measure bond-slip between steel and concrete, and obtain bond stress and bond-slip at a steel-concrete interface; the measurement sensor comprises a core measurement element, a measurement box, and two flat-head rounded-corner limiting rods (5); the core measurement element is inserted into the measurement box; and the core measurement element is located between the two flat-head rounded-corner limiting rods (5);

the core measurement element comprises a spring steel sheet (1), two electric resistance strain gauges (2), and two force transmission clamps (3), wherein the two electric resistance strain gauges (2) are respectively bonded on front and back sides in a middle of the spring steel sheet (1), each electric resistance strain gauge (2) is connected to a data acquisition instrument through a wire (14), and the wire (14) is led out from a wire leading hole (13) on a to-be-measured contact surface (11); the two force transmission clamps (3) are respectively fastened on the front and back sides of the spring steel sheet (1), a protruding structure is designed in a middle of each force transmission clamp (3), and a distance between two protruding points of the two force transmission clamps (3) is D; and a reversed deformation space is kept between the spring steel sheet (1) and the two force transmission clamps, each of the two force transmission clamps is of a $\pi$-shaped structure that comprises a top portion and two portions extending from the top portion;

the measurement box comprises a Π-shaped metal jacket (6), two rectangular metal jackets (7), two T-shaped metal jackets (8), and screws (9) with spring rings (15), the Π-shaped metal jacket is of a Π-shaped structure comprising a beam and two upstanding columns, the two upstanding columns are connected in respective upper portions thereof through the beam and orthogonal to the beam: each of the two T-shaped metal jackets is of a T-shaped structure comprising a rectangular portion and an extension portion that extends perpendicularly from a middle of the rectangular portion; wherein two sides of the Π-shaped metal jacket (6) are connected to the two rectangular metal jackets (7) through the screws (9), bottoms of the two rectangular metal jackets (7) are rigidly connected to upper parts of the two T-shaped metal jackets (8), and bottoms of the two T-shaped metal jackets (8) and the to-be-measured contact surface (11) are sealed through sealant; a rectangular groove is provided for insertion of a core element on an upper inner wall of the Π-shaped metal jacket (6), inner walls of the rectangular metal jackets (7), and inner walls of the two T-shaped metal jackets (8);

the wire leading hole (13) is provided on the to-be-measured contact surface (11), two threaded holes (12) used for fastening the flat-head rounded-corner limiting rods (5) are provided on two sides of the wire leading hole (13), the two threaded holes (12) and the wire leading hole (13) are arranged along a direction of to-be-measured bond-slip; and a distance between the two threaded holes (12) is D.

2. The measurement sensor for measuring bond-slip at a SCI according to claim 1, wherein short edges of the two T-shaped metal jackets (8) are arranged along the direction of the to-be-measured bond-slip.

3. A method for measuring bond-slip at a SCI by using the sensor according to claim 2, comprising the following steps:

step 1: drilling three holes on the to-be-measured contact surface (11), wherein two of the holes are used for fastening the flat-head rounded-corner limiting rods (5); another one is used for leading out a measurement wire; the two flat-head rounded-corner limiting rods (5) may carry load together without relative displacement, and no deformation occurs during a loading process of the two flat-head rounded-corner limiting rods (5), so as to reflect a real situation of a measuring point position at a steel-concrete interface;

step 2: assembling the core measurement element and the measurement box, and inserting the core measurement element between the two flat-head rounded-corner limiting rods (5) to make the two protruding points of the two force transmission clamps (3) on two sides of the core measurement element be exactly in close contact with the flat-head rounded-corner limiting rods (5);

step 3: when relative slip occurs at the SCI of a steel-concrete structure, concrete deformation will push the whole measurement box to slightly slip along a direction of required bond-slip measurement, and thus the whole measurement box is loaded and transmits force to the core measurement element; because the two flat-head rounded-corner limiting rods (5) are fastened, the two protruding points on two sides of the two force transmission clamps (3) are subjected to a displacement constraint, causing deformation of the core measurement element and deformation of the spring steel sheet; and deformation of the spring steel sheet is measured by the electric resistance strain gauges (2) and is acquired through a data acquisition system;

step 4: obtaining a stress-strain relationship curve of a bond-slip measurement sensor after load calibration is repeatedly conducted on this sensor, or obtaining a displacement-strain relationship curve of a bond-slip measurement sensor after displacement calibration is conducted on this sensor, which is used for establishing a bond-slip mechanical model at a SCI and for studying a bond-slip behavior at a SCI of the steel-concrete composite structure.

4. The measurement sensor for measuring bond-slip at a SCI according to claim 1, wherein the protruding structure in the middle of the force transmission clamp (3) is of a pyramidal protruding structure.

5. A method for measuring bond-slip at a SCI by using the sensor according to claim 4, comprising the following steps:

step 1: drilling three holes on the to-be-measured contact surface (11), wherein two of the holes are used for fastening the flat-head rounded-corner limiting rods (5); another one is used for leading out a measurement wire; the two flat-head rounded-corner limiting rods (5) may carry load together without relative displacement, and no deformation occurs during a loading process of the two flat-head rounded-corner limiting rods (5), so as to reflect a real situation of a measuring point position at a steel-concrete interface;

step 2: assembling the core measurement element and the measurement box, and inserting the core measurement element between the two flat-head rounded-corner limiting rods (5) to make the two protruding points of the two force transmission clamps (3) on two sides of the core measurement element be exactly in close contact with the flat-head rounded-corner limiting rods (5);

step 3: when relative slip occurs at the SCI of a steel-concrete structure, concrete deformation will push the whole measurement box to slightly slip along a direction of required bond-slip measurement, and thus the whole measurement box is loaded and transmits force to the core measurement element; because the two flat-head rounded-corner limiting rods (5) are fastened, the two protruding points on two sides of the two force transmission clamps (3) are subjected to a displacement constraint, causing deformation of the core measurement element and deformation of the spring steel sheet; and deformation of the spring steel sheet is measured by the electric resistance strain gauges (2) and is acquired through a data acquisition system;

step 4: obtaining a stress-strain relationship curve of a bond-slip measurement sensor after load calibration is repeatedly conducted on this sensor, or obtaining a displacement-strain relationship curve of a bond-slip measurement sensor after displacement calibration is conducted on this sensor, which is used for establishing a bond-slip mechanical model at a SCI and for studying a bond-slip behavior at a SCI of the steel-concrete composite structure.

6. The measurement sensor for measuring bond-slip at a SCI according to claim 1, wherein joining surfaces between adjacent two of the Π-shaped metal jacket, the two rectangular metal jackets, the two T-shaped metal jackets and the screws, of the measurement box, the bottoms of the two T-shaped metal jackets (8), and the to-be-measured contact surface (11) are sealed through sealant.

7. A method for measuring bond-slip at a SCI by using the sensor according to claim 6, comprising the following steps:

step 1: drilling three holes on the to-be-measured contact surface (11), wherein two of the holes are used for fastening the flat-head rounded-corner limiting rods (5); another one is used for leading out a measurement wire; the two flat-head rounded-corner limiting rods (5) may carry load together without relative displacement, and no deformation occurs during a loading process of the two flat-head rounded-corner limiting rods (5), so as to reflect a real situation of a measuring point position at a steel-concrete interface;

step 2: assembling the core measurement element and the measurement box, and inserting the core measurement element between the two flat-head rounded-corner limiting rods (5) to make the two protruding points of the two force transmission clamps (3) on two sides of the core measurement element be exactly in close contact with the flat-head rounded-corner limiting rods (5);

step 3: when relative slip occurs at the SCI of a steel-concrete structure, concrete deformation will push the whole measurement box to slightly slip along a direction of required bond-slip measurement, and thus the whole measurement box is loaded and transmits force to the core measurement element; because the two flat-head rounded-corner limiting rods (5) are fastened, the two protruding points on two sides of the two force transmission clamps (3) are subjected to a displacement constraint, causing deformation of the core measurement element and deformation of the spring steel sheet; and deformation of the spring steel sheet is measured by the electric resistance strain gauges (2) and is acquired through a data acquisition system;

step 4: obtaining a stress-strain relationship curve of a bond-slip measurement sensor after load calibration is repeatedly conducted on this sensor, or obtaining a displacement-strain relationship curve of a bond-slip measurement sensor after displacement calibration is conducted on this sensor, which is used for establishing a bond-slip mechanical model at a SCI and for studying a bond-slip behavior at a SCI of the steel-concrete composite structure.

8. A method for measuring bond-slip at a SCI by using the sensor according to claim 1, comprising the following steps:
   step 1: drilling three holes on the to-be-measured contact surface (11), wherein two of the holes are used for fastening the flat-head rounded-corner limiting rods (5); another one is used for leading out a measurement wire; the two flat-head rounded-corner limiting rods (5) may carry load together without relative displacement, and no deformation occurs during a loading process of the two flat-head rounded-corner limiting rods (5), so as to reflect a real situation of a measuring point position at a steel-concrete interface;
   step 2: assembling the core measurement element and the measurement box, and inserting the core measurement element between the two flat-head rounded-corner limiting rods (5) to make the two protruding points of the two force transmission clamps (3) on two sides of the core measurement element be exactly in close contact with the flat-head rounded-corner limiting rods (5);
   step 3: when relative slip occurs at the SCI of a steel-concrete structure, concrete deformation will push the whole measurement box to slightly slip along a direction of required bond-slip measurement, and thus the whole measurement box is loaded and transmits force to the core measurement element; because the two flat-head rounded-corner limiting rods (5) are fastened, the two protruding points on two sides of the two force transmission clamps (3) are subjected to a displacement constraint, causing deformation of the core measurement element and deformation of the spring steel sheet; and deformation of the spring steel sheet is measured by the electric resistance strain gauges (2) and is acquired through a data acquisition system; and
   step 4: obtaining a stress-strain relationship curve of a bond-slip measurement sensor after load calibration is repeatedly conducted on this sensor, or obtaining a displacement-strain relationship curve of a bond-slip measurement sensor after displacement calibration is conducted on this sensor, which is used for establishing a bond-slip mechanical model at a SCI and for studying a bond-slip behavior at a SCI of the steel-concrete composite structure.

* * * * *